(12) United States Patent
Kiyota

(10) Patent No.: US 8,123,091 B2
(45) Date of Patent: Feb. 28, 2012

(54) INSTALLATION STRUCTURE FOR ROOF RAIL

(75) Inventor: Naohiko Kiyota, Yokohama (JP)

(73) Assignee: Faltec Company Limited, Kawasaki (JP)

( * ) Notice: Subject to any disclaimer, the term of this patent is extended or adjusted under 35 U.S.C. 154(b) by 551 days.

(21) Appl. No.: 12/316,232

(22) Filed: Dec. 9, 2008

(65) Prior Publication Data

US 2009/0145941 A1    Jun. 11, 2009

(30) Foreign Application Priority Data

Dec. 11, 2007    (JP) ................. P2007-319825

(51) Int. Cl.
*B60R 9/04*    (2006.01)
(52) U.S. Cl. ......... 224/326; 224/309; 277/630; 277/637
(58) Field of Classification Search ........ 224/309–327; 277/630, 637, 644; 280/762, 769
See application file for complete search history.

(56) References Cited

U.S. PATENT DOCUMENTS

| | | | | |
|---|---|---|---|---|
| 3,519,179 A | * | 7/1970 | Stephen | 224/326 |
| RE27,085 E | * | 3/1971 | Weidner, Jr. | 277/644 |
| 4,206,931 A | * | 6/1980 | Tomita et al. | 277/637 |
| 5,497,925 A | * | 3/1996 | Lumpe et al. | 224/326 |
| 6,089,427 A | * | 7/2000 | Evels et al. | 224/309 |
| 6,158,637 A | * | 12/2000 | Fisch et al. | 224/309 |
| 6,902,229 B2 | * | 6/2005 | Bradbrook et al. | 224/309 |
| 2007/0194069 A1 | * | 8/2007 | Binder et al. | 224/326 |
| 2009/0272730 A1 | * | 11/2009 | Friel et al. | 219/439 |

FOREIGN PATENT DOCUMENTS

| | | |
|---|---|---|
| JP | S61-024336 U | 2/1986 |
| JP | H03-008944 | 1/1991 |
| JP | H03-008944 U | 1/1991 |
| JP | H07-040297 | 7/1995 |
| JP | H07-040297 U | 7/1995 |
| JP | 09-095185 | 4/1997 |
| JP | 2007-145102 | 6/2007 |
| KR | 10-0131686 B1 | 4/1998 |

OTHER PUBLICATIONS

Japanese Patent Office, Office Action, Dec. 15, 2009, from Japanese Patent Application No. 2007-319825, filed on Dec. 11, 2007.
The Korean Intellectual Property Office, Office Action, Jun. 17, 2010, from counterpart Korean Patent Application No. 10-2008-0124509, filed on Dec. 9, 2008, with English translation.

* cited by examiner

*Primary Examiner* — Gary Elkins
(74) *Attorney, Agent, or Firm* — Kenyon & Kenyon LLP

(57) ABSTRACT

The installation structure of a roof rail in which the roof rail is attached to a vehicle inner panel provided underneath a roof panel, through a hole part provided in a roof panel, the installation structure includes: a protruding part which is provided protruding downward from a lower surface of the roof rail, is inserted into the hole part with a gap in-between, and is attached to an upper surface of the vehicle inner panel; and a watertight part which encloses the protruding part, and is flattened between the lower surface of the roof rail and the upper surface of the roof panel, wherein a part of the watertight part extends through the hole part and protrudes beyond the lower surface of the roof panel.

8 Claims, 5 Drawing Sheets

INSTALLATION STRUCTURE FOR ROOF RAIL

Priority is claimed on Japanese Patent Application No. 2007-319825, filed Dec. 11, 2007, the content of which are incorporated herein by reference.

BACKGROUND OF THE INVENTION

1. Field of the Invention

The present invention relates to an installation structure for a roof rail of a vehicle.

2. Description of Related Art

As shown in FIG. 5, some vehicles are provided with a pair of roof rails 101 at the both sides in the width direction of the roof of a vehicle, in order to carry loads. As shown in FIGS. 6A and 6B, in genera, a particular structure is adopted in which the roof rail 101 is fastened with bolts at a part where the structural strength is insured, e.g., junction of a roof panel 104 and a body side panel 105.

However, for example, in the structure disclosed in the Japanese Unexamined Patent Application, First Publication H-09-095185, the roof rails are provided at positions away from the junction of a roof panel and body side panels. Instead, at the installation position of the roof rail, a support part is provided. In the structure disclosed in the Japanese Unexamined Patent Application, First Publication 2007-145102, a roof outer panel is directly welded to a roof reinforcing part. The roof rail is provided on the roof reinforce and the roof outer panel.

However, it is desired, from design point of view, to make narrower the junction between the roof panel and the body side panel and also the roof molding, which is fitted at the junction, so that the junction and the roof molding do not visually stand out.

Accordingly, it is necessary to position the roof rail at a position on the roof panel, closer to the vehicle center than the junction. Therefore, it is conceivable to attach the roof rail on a vehicle inner panel provided underneath the roof panel, through a hole part formed in the roof panel.

However, if the distance between the roof panel and the vehicle inner panel is not uniform, it becomes difficult to retain the water-tightness of the hole part formed in the roof panel. In this case, there is a problem in that rainwater leaks into the vehicle interior, and decrease the commercial value of the vehicle. In addition, there is a problem in that, if a load is applied on the roof rail, the relative positional relationship of the roof rail and the hole part formed in the roof panel and the like changes. Therefore, the possibility of the rainwater leakage becomes lager.

In consideration of the above circumstances, an object of the present invention is to provide an installation structure of a roof rail in which the roof rail is attached to the vehicle inner panel provided underneath the roof panel, through a hole part formed in the roof panel, which is capable to maintain water-tightness at the hole part, and to prevent leakage of rainwater and the like into the vehicle interior, even if an alignment error between the roof panel and the vehicle inner panel occurs, or the relative position of the roof rail and the hole part deviates.

SUMMARY OF THE INVENTION (1) An aspect of the present invention employs the following: an installation structure of a roof rail in which the roof rail is attached to a vehicle inner panel provided underneath a roof panel, through a hole part provided in a roof panel, the installation structure including: a protruding part which is provided protruding downward from a lower surface of the roof rail, is inserted into the hole part with a gap in-between, and is attached to an upper surface of the vehicle inner panel; and a watertight part which encloses the protruding part, and is flattened between the lower surface of the roof rail and the upper surface of the roof panel, wherein a part of the watertight part extends through the hole part and protrudes beyond the lower surface of the roof panel.

According to the installation structure, advantageous effects including the followings can be achieved: even if the alignment precision is not consistent among the roof panel and the vehicle inner panel, or if a load is applied on the roof rail and the relative position of the roof rail and the hole part deviates, the structure can maintain the water-tightness at the hole part, and reliably prevent leakage of rainwater and the like into the vehicle interior.

(2) The installation structure of the roof rail may be constituted as follows: a protruding length of the watertight part is at least 1 mm from the lower surface of the roof panel.

In this case, even if a misalignment between the vehicle inner panel and the roof panel occurs or the relative position of the vehicle inner panel and the roof panel deviates, a part of the watertight part is maintained to be stuffed into the gap between the protruding part of the roof rail and the hole part of the roof panel. Accordingly, the leakage of rainwater through the gap can be reliably prevented.

(3) The installation structure of the roof rail may be constituted as follows: a compression rate of the watertight part is within a first predetermined range; and the length of the contacting part of the watertight part to the roof panel from the fringe of the hole part is within a second predetermined range.

In this case, a) the flattened amount (compression rate) by which the watertight part is flattened between the roof rail and the roof panel, and b) the adhered width (contacting length) of the watertight part to the roof panel from the fringe of the hole part are arranged to reside within a predetermined range. Accordingly, rainwater leakage can be prevented even more reliably.

(4) The installation structure of the roof rail may be constituted as follows: the installation structure further includes a plurality of the protruding parts provided on the roof rail; and the same number of the hole parts as the plurality of the protruding parts provided in the roof panel; wherein each of the protruding parts is provided with the watertight part.

DETAILED DESCRIPTION OF THE INVENTION

Hereinafter, one embodiment of an installation structure of a roof rail according to the present invention is explained with reference to the figures.

Figure 1:
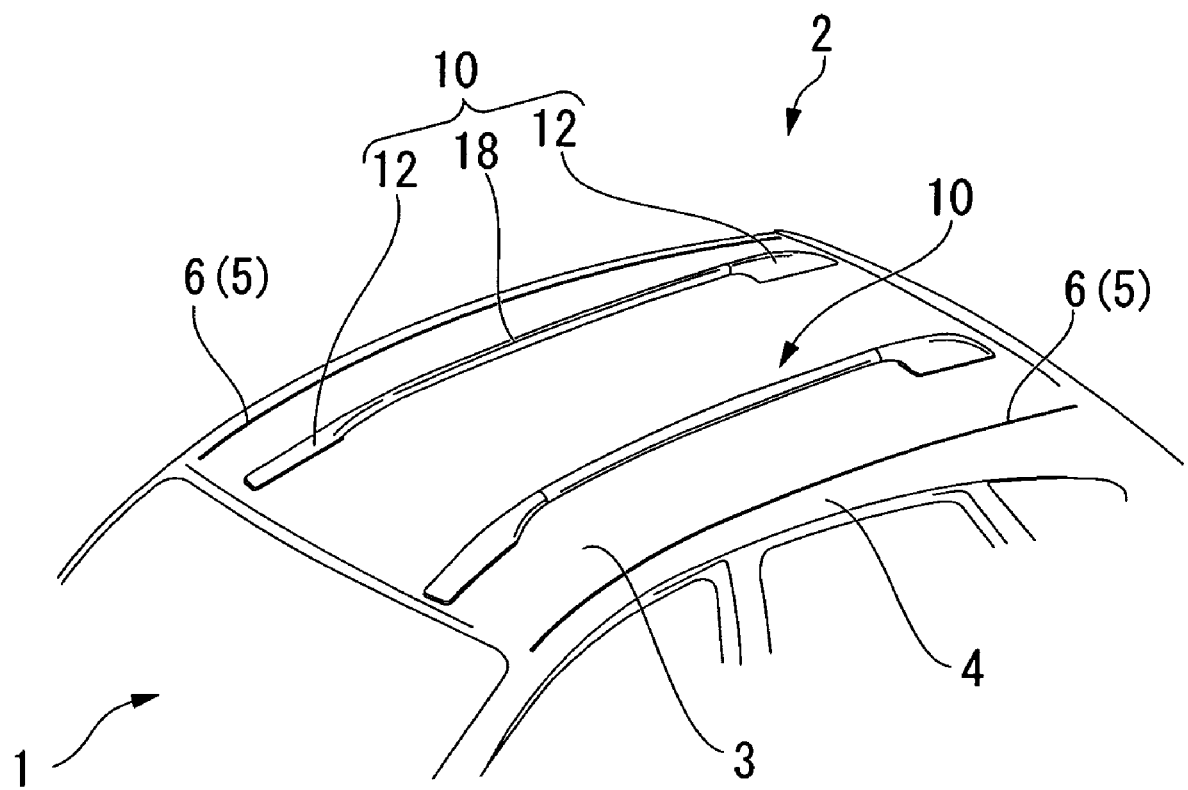
FIG. 1 is a perspective view of an installation structure of a roof rail according to an embodiment of the present invention.

FIG. 1 is a perspective view of the installation structure of the roof rail.

A pair of roof rails 10 is provided on vehicle 1 such as a passenger automobile along the front-rear direction thereof at the both sides on the roof 2.

Each roof rail 10 includes a pair of leg parts 12 and a rail part 18 provided between the leg parts 12.

The roof rails 10 are provided at positions closer to the vehicle center than a pair of roof moldings 6. The roof moldings 6 are inserted into the junction 5 between the roof panel 3 and the body side panel 4. The roof rails 10 are provided at positions inside of those junctions 5 in the vehicle width direction.

Figure 2A:
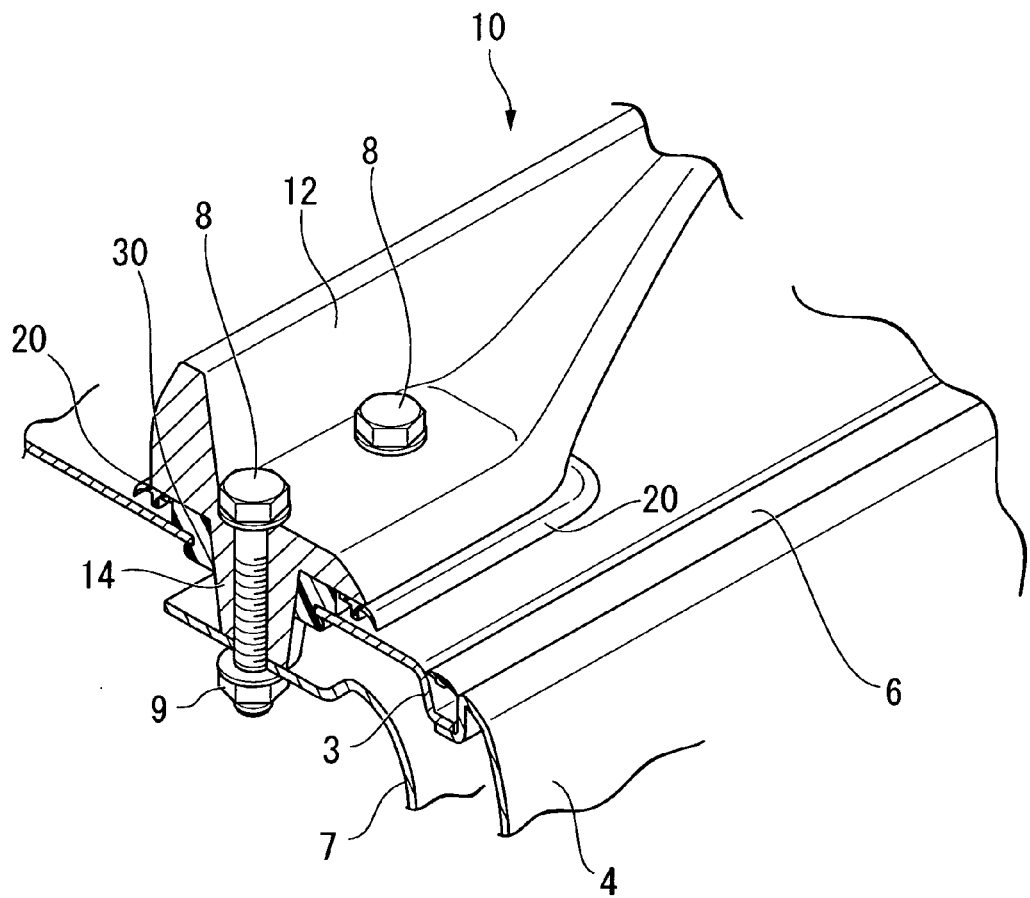
FIG. 2A is a perspective cross-section of the installation structure of the roof rail according to the embodiment.
Figure 2B:
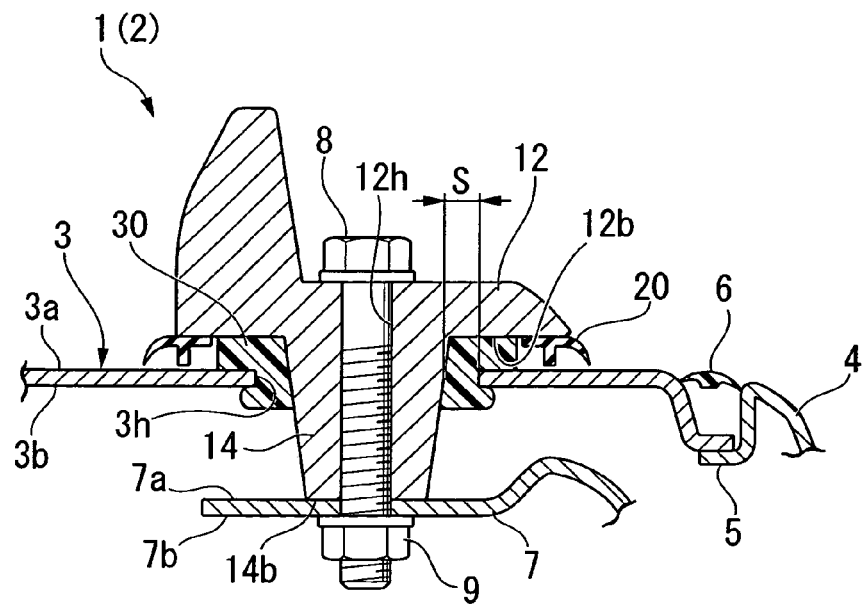
FIG. 2B is a cross-section of the installation structure of the roof rail according to the embodiment.
Figure 6A:
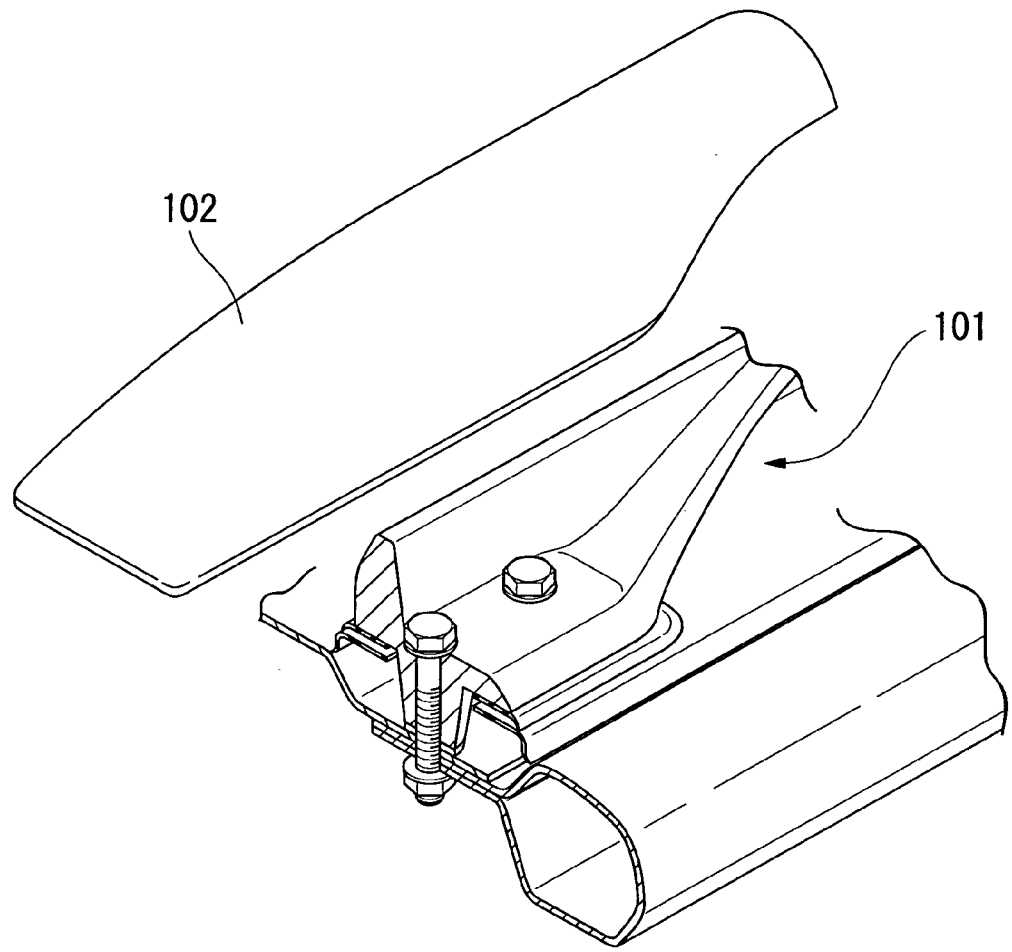
FIG. 6A is a perspective view of an example of a conventional installation stricture of a roof rail.
Figure 6B:
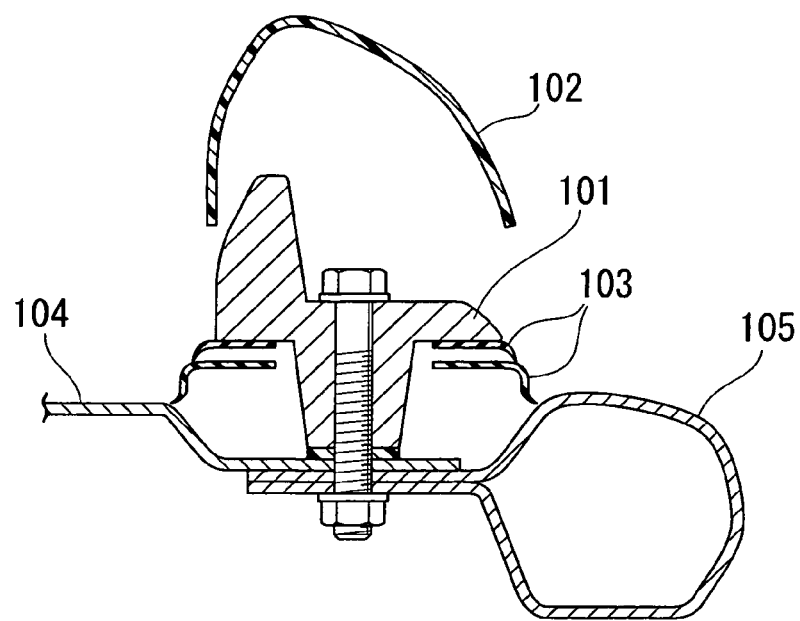
FIG. 6B is a cross section of the conventional installation structure of the roof rail.

FIGS. 2A and 2B are cross-sections of the installation structure of the roof rail according to the embodiment. In FIGS. 2A and 2B, covers 102, 103 (shown in FIGS. 6A and 6B) provided at an upper surface side of each leg parts 12 are omitted.

Figure 3A:
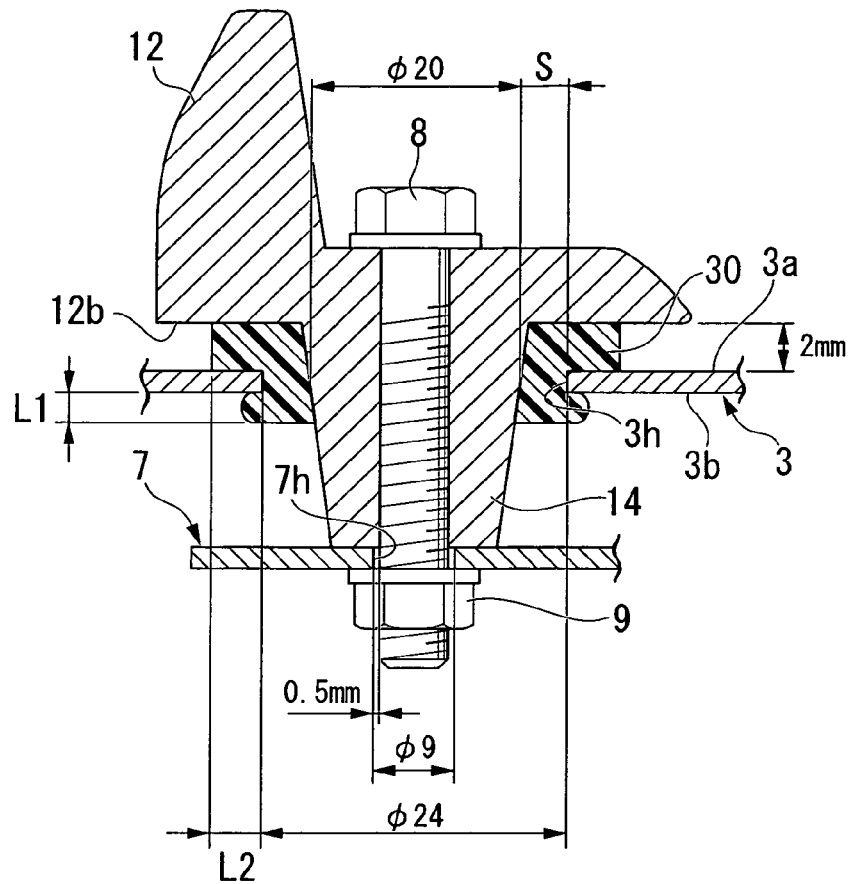
FIG. 3A is a cross-section of one example of an installation showing the forms of a protruding part of the roof rail, a hole part of a roof panel, and a watertight part, according to the embodiment.
Figure 3B:
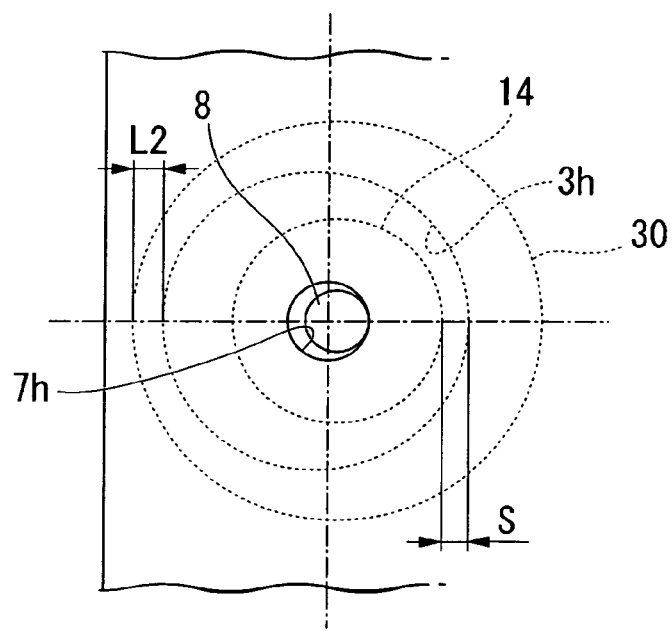
FIG. 3B is a plan view of the same region as FIG. 3A.

The leg parts 12 of the roof rail 10 are provided with a plurality of protruding parts 14 which extends downward from the lower surface 12b of the leg parts 12 (see FIGS. 3A and 3B). Each leg part 12 is provided with two of the protruding parts 14, in this embodiment.

The leg parts 12 are aluminum die casts. The cylindrical protruding part 14 has a tapered shape with its distal part having a smaller diameter. The tapered shape is formed as a casting draft.

A plurality of hole parts 3h are formed on the roof panel 3 so that the number of the hole parts 3h corresponds to the number of protruding parts 14. The inner diameter of the hole parts 3h is bigger than the outer diameter of the protruding parts 14. The plurality of hole parts 3h are arranged along the front-rear direction of the vehicle 1 at positions closer to the roof panel 3 side (closer to the vehicle center) than the junctions 5 of the roof panel 3 and the body side panels 4.

The protruding parts 14 of the leg parts 12 are each inserted into one of the hole parts 3h on the roof panel 3, and are fastened by bolts 8 on the vehicle inner panel 7 provided underneath the roof panel 3. The bolts 8 are inserted into the bolt holes 12h which penetrates the protruding part 14 from the upper surface side of the leg parts 12. The bolts make the lower surfaces 14b of the protruding parts 14 contact with the upper surface 7a of the vehicle inner panel 7. The bolt 8 and a nut 9 provided on a lower surface 7b of the vehicle inner panel 7 fasten the leg parts 12.

The vehicle inner panel 7 has a sufficient thickness so as be strong enough to hold the leg parts 12.

A ring shaped watertight part 30 is provided so as to wrap around each protruding part 14 of the leg parts 12. The watertight parts 30 are flattened between the lower surfaces 12b of the leg parts 12 and the upper surface 3a of the roof panel 3, when the leg parts 12 are attached to the vehicle inner panel 7. At this time, a part of the watertight part 30 protrudes out toward the lower surface 3b side, from the gap S between the protruding part 14 of the leg part 12 and the hole part 3h of the roof panel 3.

The watertight part 30 may be made of elastic materials such as polyurethane or rubber. The watertight part 30 provides air-tightness and water-tightness, by being flattened between parts and by penetrating into narrow gaps.

For the watertight part 30 materials, Superseat, or Superseal (trade name) may be preferably used. A preferable example of physical properties of the watertight part 30 is as follows: a density of 0.06 g/cm$^3$; a tensile strength of 1.9 kgf/cm$^2$; a stretch of 140%.

When the watertight part 30 is arranged at the protruding part 14, it is preferable not to use adhesive glue or adhesive tape, in order not to interfere with the deformation of the watertight part 30.

Accordingly, the watertight parts 30 are flattened (compressed) between the lower surfaces 12b of the leg parts 12 and the upper surface 3a of the roof panel 3, and a part of the watertight part 30 protrudes out toward the lower surface 3b side, from the gap S between the protruding part 14 of the leg part 12 and the hole part 3h of the roof panel 3. By this function, the gap S is sealed, and thereby, rainwater leakage from the hole parts 3h of the roof panel 3 into the interior of the vehicle 1 is prevented.

A rubber cover 20 is provided at the outer side of the lower surface 12b of the leg part 12, in order to conceal the gap between the leg part 12 and the roof panel 3. This cover 20 also assists to prevent rainwater and/or dust penetration.

FIGS. 3A and 3B show one example of an installation and forms of the protruding part 14 of the leg parts 12, hole parts 3h of the roof panel 3, and the watertight part 30.

The vehicle inner panel 7 and the roof panel 3 are not directly connected at the vicinity of the roof rail 10. Accordingly, due to alignment errors occurred during the production processes, the relative positional relationship of the vehicle inner panel 7 and the roof panel 3 deviates among produced vehicles 1.

When the vehicle 1 runs while parcels and the like are loaded on the roof rail 10, a large load is applied to the roof rail 10 from various directions.

Therefore, the position and the attitude of the roof rail 10 in relation to the roof panel 3 changes over the time. Accordingly, even if the watertight part 30 was sealing the gap S, there is a concern that over the time, the water-tightness is compromised and rainwater or the like could penetrate into the vehicle 1 through the gap S.

According to the installation structure of the roof rail of the present embodiment, since the protruding parts 14 of the leg parts 12 and the hole parts 3h of the roof panel 3 and the watertight parts 30 are constituted as follows, the watertight parts 30 can reliably maintain the water-tightness and prevent penetration of rainwater and the like into the interior of the vehicle 1.

The constitutions and measurements shown below are provided as one example. The present invention is not limited to the constitutions and measurements.

As shown in FIGS. 3A and 3B, for the bolts 8 which fasten the leg parts 12 onto the vehicle inner panel 7, size M8 bolts with hexagon heads may be preferably used.

In order to make enough margin for the leg parts 12 to be secured onto the vehicle inner panel 7 even if the positions of the vehicle inner panel 7 and the roof panel 3 varied for each vehicle 1 due to alignment errors, the vehicle inner panel 7 is provided with bolt through holes 7h having a diameter of 9 mm, which is bigger than the diameter of the bolts 8. The average diameter of the protruding parts 14 of the leg parts 12 is 20 mm.

Accordingly, the diameter of the hole parts 3h of the roof panel 3 is arranged to be 24 mm. This is to design the structure so that a ring shaped gap S is formed between the protruding part 14 and the hole parts 3h, the ring shape having a designed width of 2.5 mm at the maximum, 1.5 mm at the minimum, and an average of 2.0 mm.

In this case, even if the relative positions of the vehicle inner panel 7 and the roof panel 3 varied due to the alignment errors, a ring shaped gap S having a width of at least 1.0 mm, at most 2.5 mm is formed (FIG. 3B).

The watertight part 30 is formed, for example, to have an inner diameter of 19 mm, an outer diameter of 36 mm, and a thickness of 10 mm.

By forming the inner diameter of the watertight part 30 smaller than the outer diameter of the protruding part 14 of the leg parts 12, the elastic watertight part 30 can be arranged on the protruding part 14 without using an adhesive or the like.

The distance between the upper surface 3a of the roof panel 3 and the lower surface 12b of the leg parts 12 is designed to be 2 mm, when these parts are assembled.

Accordingly, the watertight part 30 attached to the protruding part 14 of the leg parts 12 is flattened between the upper surface 3a of the roof panel 3 and the lower surface 12b of the leg parts 12, until the thickness of the watertight part 30 becomes 2 mm. Moreover, a part of the watertight part 30 protrudes from the gap S formed between the protruding part 14 and the hole parts 3h toward the direction from the upper surface 3a to the lower surface 3b.

As explained above, a gap S having a minimum width of 1.0 mm is formed between the protruding part 14 and the hole part 3h. Accordingly, the gap between the protruding part 14 and the hole part 3h is reliably filed with the watertight part 30. Therefore, rainwater penetration from the gap S can be reliably prevented.

The relative positions of the vehicle inner panel 7 and the roof panel 3 vary because of the alignment errors of the vehicle inner panel 7 and the roof panel 3, and the load applied onto the roof rail 10. Namely, the distance between the upper surface 3a of the roof panel 3 and the lower surface 12b of the leg parts 12 varies or changes. Therefore, the amount by which the watertight part 30 is flattened (compression rate) varies or changes. In this case, the seal of the gap S by a part of watertight part 30 can not be readily maintained constant, and there is a concern that rainwater or the like may penetrate through the gap S in the conventional structures.

Accordingly, the installation structure is arranged so that the protrusion amount L1 of the roof panel 3 to the side of the lower surface 3b (protrusion amount from the lower surface 3b) is at least equal or longer than a predetermined amount (length), even when the alignment error reaches the maximum possible amount. Particularly, the structure is arranged so that the watertight part 30 extrudes (protrudes) from the lower surface 3b of the roof panel 3 by, for example, 1 mm.

In this case, even when the alignment error or position change between the protruding part 14 of the roof rail 10 and the hole parts 3h of the roof panel 3 occur, the gap S of the protruding part 14 and the hole parts 3h is always filed with a part of the watertight part 30. Accordingly, leakage of rainwater or the like from the gap S can reliably prevented.

In order to ensure the protrusion of the watertight part 30 from the gap S, the ratio by which the watertight part 30 is flattened (compression rate) is an important factor. In addition, in reliably preventing rainwater leakage from the gap S, the contact length of the watertight part 30 and the roof panel 3 (the length of the contacting part measured from the fringe of the hole part 3h on the roof panel 3) is an important factor, since the contact between the watertight part 30 and the roof panel 3 is positioned at an entrance of the leakage path.

Accordingly, a series of experiments are conducted to clarify the relationship of the contact length and the waterproof efficiency, in order to determine a configuration having a reliable waterproof efficiency.

The compression rate of the watertight part 30 is defined as a flattened amount (thickness) relative to the initial thickness. For example, in this embodiment, the initial thickness of the watertight part 30 is 10 mm, and the thickness after the flattening is 2 mm, i.e., the flattened amount is 8 mm. Accordingly, the compression rate is 80% (theoretical value).

The contact length of the watertight part 30 is the length of the contacting part measured from the fringe of the hole part 3h, as indicated L2 in FIGS. 3A and 3B. In this particular embodiment, the contact length is 6 mm (theoretical value).

Figure 4:
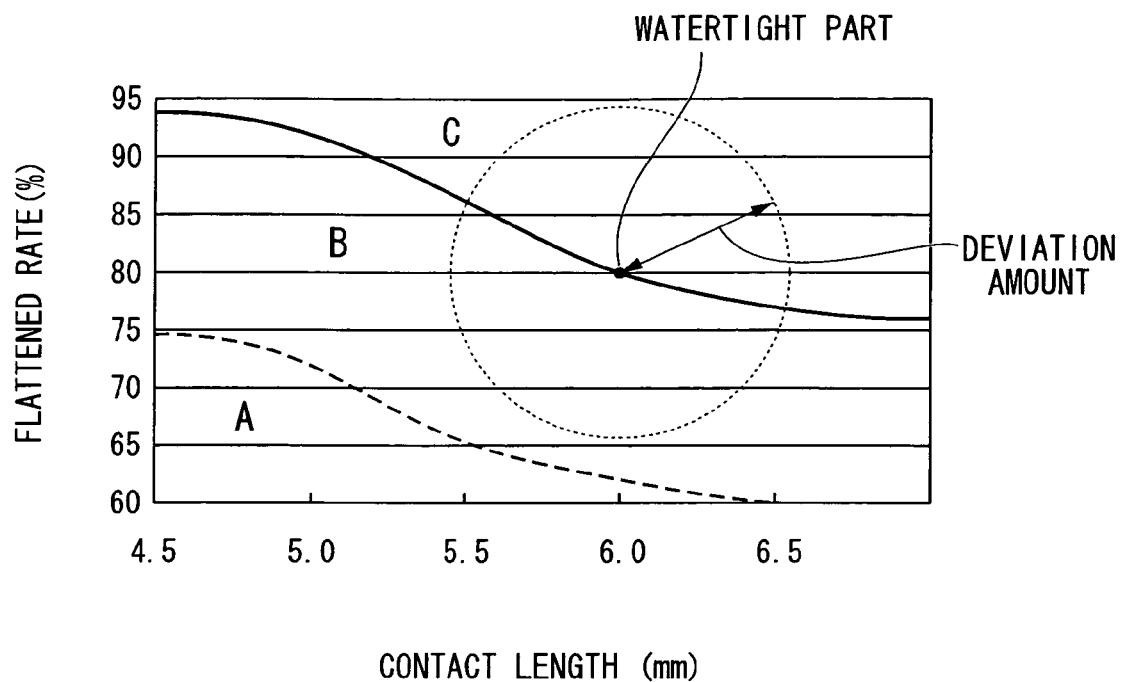
FIG. 4 is a diagram showing profile conditions of the watertight part according to the embodiment.
Figure 5:
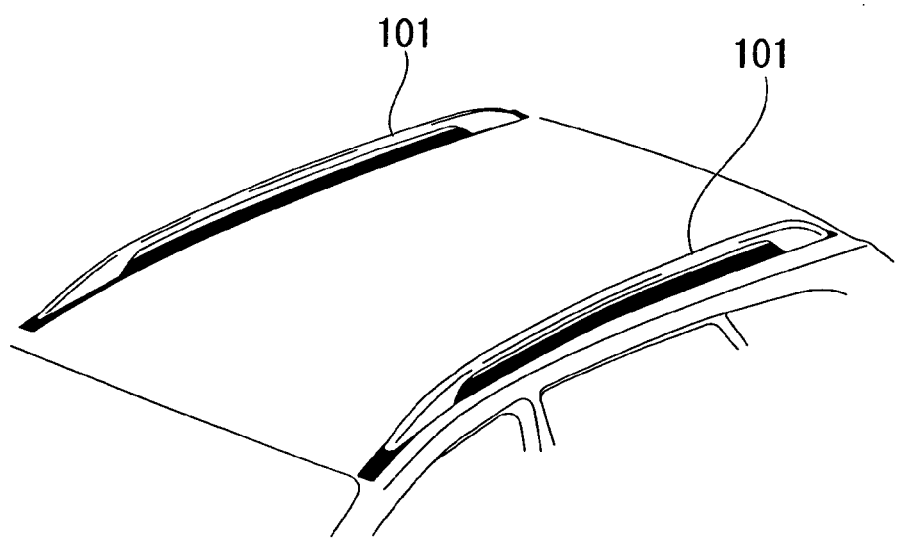
FIG. 5 is a perspective view of a conventional installation structure of a roof rail.

FIG. 4 is a diagram showing profile conditions of the watertight part.

If an installation structure of a roof rail is configured according to a condition represented by region A of FIG. 4, rainwater penetrations occur.

If an installation structure of a roof rail is configured according to a condition represented by region B of FIG. 4, although rainwater penetration can be prevented, if, for example, a repetitive load are applied on the roof rail 10, there is a concern of rainwater leakage.

If an installation structure of a roof rail is configured according to a condition represented by region C of FIG. 4, rainwater leakage from gap S can be reliably prevented.

Under a condition represented by region A of FIG. 4, both of the flattened rate (compression rate) and the contact length of the watertight part 30 are not sufficient. Accordingly, a rainwater leakage from the gap S can occur.

It is preferable to use a larger value for either the compression rate or the contact length of the watertight part 30. It is even more preferable to use larger values for both of them, so that the profile conditions of the installation structure resides in the region C of FIG. 4. In this case, rainwater leakage through the gap S can be completely prevented.

By configuring the watertight part 30 so that the profile conditions are within the region C, even if both of the compression rate and the contact length fluctuated as a result of a misalignment of the vehicle inner panel 7 and the roof panel 3, the rainwater leakage through the gap S can be reliably prevented.

For example, in the case of the watertight part 30 of the present embodiment, even when the original compression rate of 80% (theoretical value) fluctuated by approximately ±15%, and the original contact length of 6 mm (theoretical value) fluctuated by approximately ±0.5 mm, the profile conditions of the watertight part 30 would always be within the region B or C (see the circle drawn with a broken line in FIG. 4).

When the profile conditions of the watertight part 30 reside in region C, it is preferable to use a compression rate as small as possible within the region C. If the compression rate becomes 95% or lager, there is a concern that the roof panel 3 suffers an elastic strain. In particular, when a material other than above-described Superseat or Superseal (trade name) is used, the condition should be appropriately considered.

On the other hand, the contact length of the watertight part 30 should be smaller than the width of the leg parts 12. This is because otherwise the installation of the cover 20 would be hindered.

As described above, according to the installation structure of the roof rail of the present invention, when a roof rail 10 is attached to a vehicle inner panel 7 provided underneath the roof panel 3, through a hole parts 3h formed in the roof panel 3 of the vehicle 1, even when there are alignment fluctuations of the roof panel 3 and the vehicle inner panel 7, rainwater leakage can be reliably prevented.

In particular, even when the positional relationship of the protruding part 14 of the roof rail 10 and the hole part 3h of the roof panel 3 varied or changed, the gap S between the protruding part 14 of the roof rail 10 and the hole part 3h of the roof panel 3 is maintained to be filled with a part of the watertight part 30. Therefore, rainwater penetration through the gap S can be reliably prevented.

The flattened amount (compression rate) of the watertight part 30 between the roof rail 10 and the roof panel 3, and the contact length of the watertight part 30 and the roof panel 3 is configured to reside within a predetermined range. Accordingly, the rainwater penetration through the gap S can be prevented even further reliably.

In the embodiment described above, the profiles, materials, and combinations of each component are presented as one example, and various modifications can be made according to the design requirements and the like, without departing from the spirit or scope of the present invention.

For example, in the above embodiment, the protruding part 14 of the roof rail 10 and the hole part 3h of the roof panel 3 have a circular shape in plan view. However, the present invention is not limited to the case. These shapes in plan view can either be eclipses or rectangles. In these cases, the planer shape of the watertight part 30 should also be modified according to the shapes of the protruding part 14 and the hole part 3h.

In addition, the numbers of the protruding parts 14 formed on the roof rail 10 may be different among the leg parts 12 in the front or rear parts of the roof rail 10. For example, the leg parts 12 in the front part may have two protruding parts 14, while the leg parts 12 in the rear part may have three protruding parts 14. Furthermore, each profile of the protruding parts 14 (hole parts 3h, watertight part 30) may vary from each other.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An installation structure of a roof rail in which the roof rail is attached to a vehicle inner panel provided underneath a roof panel, through a hole part provided in the roof panel, the installation structure comprising:

a protruding part which is provided protruding downward from a lower surface of the roof rail, is inserted into the hole part with a ring shaped gap which is formed by a diameter of the hole part being arranged to be larger than a diameter of the protruding part, and is attached to an upper surface of the vehicle inner panel; and a watertight part which encloses the protruding part, is flattened between the lower surface of the roof rail and an upper surface of the roof panel, and seals the ring shaped gap, wherein a part of the watertight part which consists of an elastic material extends through the ring shaped gap and protrudes beyond a lower surface of the roof panel.

2. The installation structure of the roof rail according to claim 1, wherein a protruding length of the watertight part is at least 1 mm or larger from the lower surface of the roof panel.

3. The installation structure of the roof rail according to claim 1, wherein a compression rate of the watertight part is within a first predetermined range; and a length of a contacting part of the watertight part to the roof panel from a fringe of the hole part is within a second predetermined range.

4. The installation structure of the roof rail according to claim 1, further comprising:

a plurality of protruding parts provided on the roof rail; and the same number of hole parts as the plurality of the protruding parts provided in the roof panel; wherein each of the protruding parts is provided with the watertight part.

5. The installation structure of the roof rail according to claim 1, wherein the vehicle inner panel and the roof panel are not directly connected at a vicinity of the roof rail.

6. The installation structure of the roof rail according to claim 1, wherein an inner diameter of the watertight part is smaller than the diameter of the protruding part.

7. The installation structure of the roof rail according to claim 1, wherein a compression rate of the watertight part is variable when a distance between the upper surface of the roof panel and the lower surface of the roof rail varies; and a protruding length of the watertight part from the lower surface of the roof panel is maintained to be equal to or longer than a predetermined length, and a seal of the ring shaped gap by the watertight part is maintained when the compression rate of the watertight part varies.

8. The installation structure of the roof rail according to claim 1, wherein the part of the watertight part which extends through the hole part and protrudes beyond the lower surface of the roof panel forms a contacting area with the lower surface of the roof panel along the fringe of the hole part.

* * * * *